United States Patent
Benoist et al.

(10) Patent No.: US 11,711,293 B2
(45) Date of Patent: *Jul. 25, 2023

(54) PER-PROVIDER ORIGIN PULL

(71) Applicant: Fastly Inc., San Francisco, CA (US)

(72) Inventors: Julien Benoist, San Francisco, CA (US); Kristopher King Foster, San Francisco, CA (US); Joel Jaeggli, San Francisco, CA (US); Artur Bergman, Denver, CO (US)

(73) Assignee: Fastly, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,924

(22) Filed: Aug. 2, 2021

(65) Prior Publication Data

US 2021/0367879 A1     Nov. 25, 2021

Related U.S. Application Data

(63) Continuation of application No. 16/513,172, filed on Jul. 16, 2019, now Pat. No. 11,082,330.

(60) Provisional application No. 62/823,902, filed on Mar. 26, 2019.

(51) Int. Cl.
| | | |
|---|---|---|
| *H04L 12/28* | (2006.01) | |
| *H04L 45/00* | (2022.01) | |
| *H04L 45/74* | (2022.01) | |
| *H04L 45/02* | (2022.01) | |

(52) U.S. Cl.
CPC .............. *H04L 45/22* (2013.01); *H04L 45/04* (2013.01); *H04L 45/74* (2013.01)

(58) Field of Classification Search
CPC .......... H04L 45/04; H04L 45/22; H04L 45/74
See application file for complete search history.

(56) References Cited

U.S. PATENT DOCUMENTS

| | | | | |
|---|---|---|---|---|
| 9,906,618 | B2 * | 2/2018 | Bergman | ................ H04L 65/80 |
| 9,912,631 | B2 * | 3/2018 | Bergman | .............. H04L 65/612 |
| 10,044,673 | B2 * | 8/2018 | Leach | ................ H04L 61/2539 |
| 10,178,065 | B2 * | 1/2019 | Leach | ................ H04L 61/4552 |
| 2005/0207432 | A1 * | 9/2005 | Velez-Rivera | ......... G06Q 30/02 |
| | | | | 370/402 |
| 2013/0298218 | A1 * | 11/2013 | Rash | ...................... H04L 63/10 |
| | | | | 726/11 |
| 2014/0344425 | A1 * | 11/2014 | Varney | .................. H04L 41/509 |
| | | | | 709/221 |

(Continued)

*Primary Examiner* — Chi H Pham
*Assistant Examiner* — Elisabeth Benoit Magloire

(57) ABSTRACT

Systems, methods, and software are disclosed herein for routing in-bound communications to an infrastructure service. In an implementation, an infrastructure service receives a request from an end point for content associated with an origin. The service sends a connection request to the origin from an initial network address. After detecting a failure of the origin to respond to the connection request, the service sends multiple connection requests to the origin from different network addresses. Upon receiving one or more replies to the connection requests, the service identifies which reply was received first and a network address to which the reply was sent. The service proceeds to establish a connection with the origin using the identified network address and obtains the content from the origin over the connection. The infrastructure service may then send the content to the end point.

20 Claims, 7 Drawing Sheets

(56) References Cited

U.S. PATENT DOCUMENTS

| | | | |
|---|---|---|---|
| 2015/0127721 A1* | 5/2015 | Bergman | H04L 12/5691 |
| | | | 709/203 |
| 2015/0347248 A1* | 12/2015 | Araújo | G06F 11/2023 |
| | | | 714/4.11 |
| 2017/0237768 A1* | 8/2017 | Daniel | H04L 63/1458 |
| | | | 726/23 |
| 2017/0243185 A1* | 8/2017 | Wu | H04W 12/06 |
| 2018/0191667 A1* | 7/2018 | Bergman | H04L 45/025 |
| 2018/0264347 A1* | 9/2018 | Tran | A63B 43/004 |
| 2019/0036883 A1* | 1/2019 | Bergman | H04L 63/0263 |
| 2019/0166251 A1* | 5/2019 | DeLuca | H04L 41/5012 |

* cited by examiner

PER-PROVIDER ORIGIN PULL

RELATED APPLICATIONS

This application is a continuation of and claims the benefit of priority to U.S. application Ser. No. 16/513,172, filed on Jul. 16, 2019, entitled "PER-PROVIDER ORIGIN PULL," and also claims priority to U.S. Provisional Application No. 62/823,902, filed on Mar. 26, 2019, and entitled "Per-Provider Origin Pull;" both of which are hereby incorporated by reference in their entirety.

TECHNICAL FIELD

Aspects of the disclosure are related to the field of computing and communication infrastructure technology and, more particularly, to optimizing communications between an infrastructure service and an origin.

BACKGROUND

Content delivery networks, edge cloud platforms, and other types of infrastructure services send and receive huge volumes of data. The data is typically sent and received between servers and end points over logical connections that are created and torn down dynamically as needed to handle packet flows over the connections. The servers and end points establish the connections with each other, typically in accordance with one or more of a variety of protocols, such as the Transport Control Protocol (TCP).

At times, content data requested by an end point is not available and must first be retrieved from an origin before being delivered to the end point. Here too, connections are established between a server in an infrastructure service and a server at the origin to effectuate the retrieval of the content from the origin.

In both situations, multiple transit networks may connect the infrastructure service to the local network(s) that provide connectivity to the end points and origin servers. As a result, an infrastructure service connected directly to multiple transit networks may reach a given end point or origin via many possible routes. Packets sent by an infrastructure service to an end point or origin may thus traverse any one of many possible paths before reaching their destination.

In the opposite direction, from an end point or origin to the infrastructure service, packets may also traverse many possible paths as they are routed from a local ISP to one of the transit networks and ultimately to the infrastructure service. However, some in-bound paths to the infrastructure service may perform better than others at times. For example, a slow interconnect between a local ISP and a transit network may delay packets.

Unfortunately, how in-bound packets are routed to an infrastructure service is generally out of its control. Connections may be difficult to establish as a result and may be slow once they are established, resulting in sub-optimal experiences.

OVERVIEW

Technology is disclosed herein for routing in-bound communications to an infrastructure service over specific transit networks such that connections between the service and origin servers may be established more quickly and content delivered with less delay.

In an implementation, an infrastructure service receives a request from an end point for content associated with an origin. The service sends a connection request to the origin from an initial network address. After detecting a failure of the origin to respond to the connection request, the service sends multiple connection requests to the origin from different network addresses. Upon receiving one or more replies to the connection requests, the service identifies which reply was received first and a network address to which the reply was sent. The service proceeds to establish a connection with the origin using the identified network address and obtains the content from the origin over the connection. The infrastructure service may then send the data to the end point.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Technology is disclosed herein that improves the functioning of computer and communication networks. In particular, a connection process employed by an infrastructure service is disclosed that gives the infrastructure service an improved level of control over the route taken by in-bound traffic from an origin. As a result, the speed with which connections between an infrastructure service and origin servers are established may be increased, thereby improving the end-to-end experience of obtaining content from an origin server. The speed with which the content is obtained may also be increased.

In various implementations, an infrastructure service employing the connection process attempts initially to establish a connection with an origin using a first network address as the source of its connection requests to the origin. A timer is set against the connection request and, if a reply is not received within the time limit, multiple new connection requests are sent to the origin. However, each of the new connection requests are sent using a different source address than the others. As a result, the replies to the new connection requests are each sent to a different destination address relative to each other—the source addresses of the requests.

When one or more replies to the connection requests are received, the source address of the first reply to be receive is used moving forward to establish the connection and to obtain the content. Subsequent in-bound traffic from the origin over the established connection will therefore be sent to the source address of the first reply. In this manner, the likelihood that the subsequent communications with the origin are faster than they otherwise would be is increased based on the fact of the first reply having arrived at the infrastructure service with less delay than the others.

In some implementations, the path taken by the in-bound traffic from the origin to the infrastructure service varies based on the source address used to establish the connection. For example, multiple transit networks may connect to the infrastructure service. The infrastructure service may announce a different source address (or range of addresses) to each of the transit networks. In-bound traffic from the origin that is addressed to a given source address will therefore traverse the transit network to which it was announced—and not the others. The first reply to be received therefore gives some indication of which in-bound path is the fastest and therefore which source address results in the fastest in-bound traffic. The speed of the in-bound traffic may be influenced by, among other possible factors, the performance of the interconnects between the transit networks and one or more upstream networks that carry traffic to and from the origin (e.g. a local Internet service provider).

Figure 1:
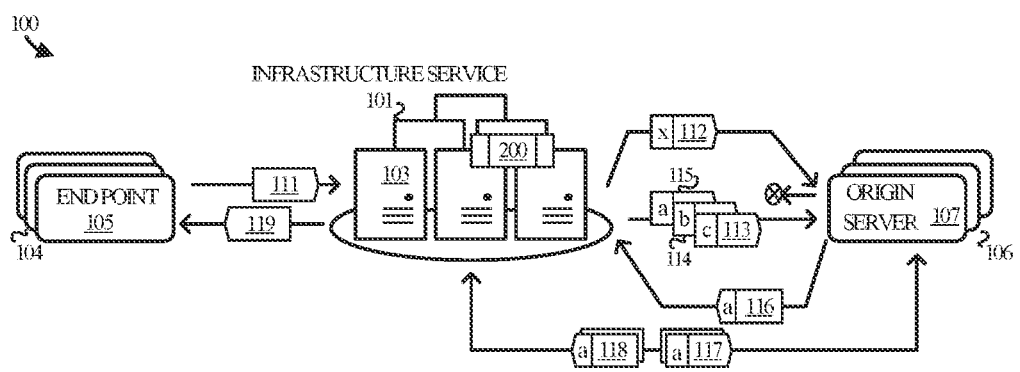
FIG. 1 illustrates an operational environment and related scenario in an implementation.

Referring now to the drawings, FIG. 1 illustrates operational environment 100 in an implementation. Operational environment 100 includes infrastructure service 101, end points 104, and origin servers 106. End points 105 communicate requests for data to infrastructure service 101. Infrastructure service 101 may serve the data from a local cache or obtain the data from one or more of origin servers 106, of which origin server 105 is representative.

Figure 6:
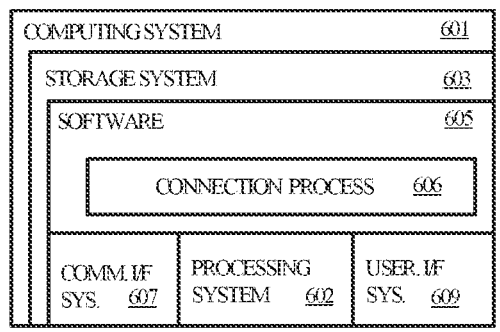
FIG. 6 illustrates a computing system suitable for implementing the various operational environments, architectures, processes, scenarios, and sequences discussed below with respect to the Figures.

Infrastructure service 101 is representative of a content delivery network, an edge cloud platform, or the like, and is comprised of various physical and/or virtual computing and communication elements suitable for implementing a variety of associated infrastructure services, of which computing system 601 in FIG. 6 is representative. For example, infrastructure service 101 may include routers, servers, and other elements that function together to serve content to end points 104. Infrastructure service 105 may obtain the content from origin servers 106 and cache the content on its servers for faster serving to end points. Examples of content that may be served to end points include text, images, video, web pages, objects, applications, or any other type of content.

End points 104 are representative of the various computing devices from which requests for content may originate and to which content may be served, such as consumer devices, enterprise devices, and the like. Examples include, but are not limited to, laptop and desktop computers, tablets, mobile phones, wearable devices, entertainment devices, gaming devices, other server computers, Internet of Things (IoT) devices, or any other type of end point device. End points 104 communicate with infrastructure service 101 over one or more public or private communication networks (e.g. the Internet).

Origin servers 106 are representative of the various physical and/or virtual computing devices capable of storing content and providing the content to infrastructure service 101 to be served to end points. Examples include, but are not limited to, server computers and data storage devices deployed on-premises, in the cloud, or elsewhere, by content providers such as enterprises, organizations, individuals, and the like.

Infrastructure service 101 communicates with origin servers 106 over transport layer connections that are established to facilitate the exchange of data. The connections may be established in accordance with a variety of communication protocols such as the transmission control protocol (TCP), the stream control transmission protocol (SCTP), and other connection-oriented protocols. Connectionless protocols such as the user datagram protocol (UDP) may also be employed in some implementations.

Establishing a given connection begins with infrastructure service 101 sending a connection request to an origin server, e.g. origin server 107. Origin server 107 receives the request and typically sends a reply back to infrastructure service 101 acknowledging the request and potentially including additional information to effectuate the connection. Once established, infrastructure service 101 may send a content request to obtain the specific content that may have been requested by an end point, such as a web page, video, application, or the like.

The process of establishing the connection with origin server 107 may be hindered by a variety of factors, including the speed with which origin server 107 can reply to infrastructure service 101. As discussed above, infrastructure service 101 may send out-bound traffic to origin server 107 (e.g. the connection request) via one of multiple transit networks. The choice of which transit network to use may be algorithmically governed by infrastructure service 101 based on considerations of speed and/or cost. The transit networks connect to a local network which provides Internet connectivity to origin server 107. The out-bound traffic is thus delivered to origin server 107 by way of the selected transit network and the local network to which it connects.

In-bound traffic to infrastructure service 101 (e.g. the acknowledgment reply) travels in the opposite direction and heretofore may arrive by way of any of the transit networks that connect to infrastructure service 101. That is, the choice of transit network for the in-bound traffic is made by the local network provider based on its own considerations. This is possible because the network address to which the in-bound traffic is sent can be reached via any of the transit networks due to infrastructure service 101 having announced the address (or route) to all of the transit networks. The transit networks further announce the network address to other networks downstream from them, including the local network that connects to the origin. The local network therefore is able to reach infrastructure service through any of the transit networks, giving it leeway to select the path based on its own speed, cost, or other considerations.

Unfortunately, this arrangement may result in a situation where inbound traffic sent from origin server 107 to infrastructure service 101 is delayed more so than normal due to a slow interconnect between the local network and a transit network. The interconnect may be slow for technical reasons, such as failed or failing equipment, or even for contractual or other business reasons, such as a dispute between the two networks. Regardless, the end result is that the connection between infrastructure service 101 and origin server 107 takes too long to setup—or cannot be setup at all.

Figure 2:
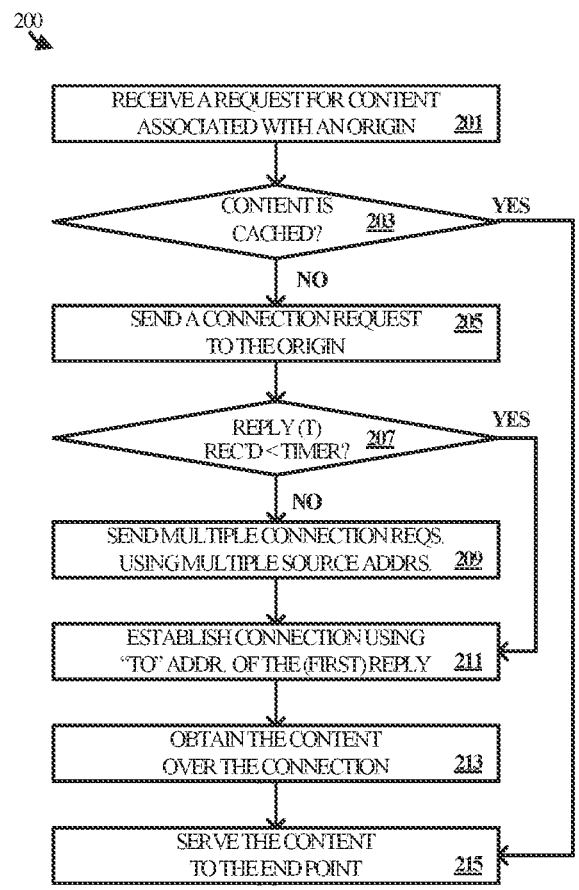
FIG. 2 illustrates a connection process in an implementation.

To mitigate the sub-optimal effects of such a situation, infrastructure service 101 instead employs a connection process 200 for establishing connections with the origin. Connection process 200 may be implemented in program instructions in the context of any of the software applications, modules, components, or other such programming elements deployed in the various elements of infrastructure service 101, such as switches, routers, and servers. The program instructions direct the underlying physical or virtual computing system or systems to operate as follows, referring parenthetically to the steps in FIG. 2 in the context of the operational environment 100 of FIG. 1.

In operation, infrastructure service 101 receives a request for content associated with an origin (step 201). The request may have been sent by, for example, an end point, a node or point of presence (PoP) within the service, another service or application, or from any other source. The request may identify the content by a file name, a uniform resource locator (URL), a string, or on some other manner. In one example, the request is a hypertext transfer protocol (HTTP) get request that identifies the content.

Infrastructure service 101 parses the request to identify the content and then determines whether the content is cached locally (step 203). If the content is cached locally, infrastructure service 101 may serve the content to the source of the request (step 215). If the content is not cached locally (or if it is cached locally but is out of date), then infrastructure service 101 sends a connection request to the origin of the content from a source address (step 205). Infrastructure service 101 also sets a timer against the expected reply from the origin.

The origin may receive the connection request and attempts to reply using the source address of the connection request. Infrastructure service 101 monitors for the reply and determines whether a reply has been received within the time limit set by the timer (step 207), e.g. 300 milliseconds, although other time limits are possible. If the reply is received within the time limit, infrastructure service 101 proceeds to establish a connection with the origin using the same source address (step 211), obtains the content from the origin over the connection (step 213), and serves the content to the source (step 215).

However, if the time expires before a reply is received, then infrastructure service 101 sends multiple connection requests to the origin using different source addresses for each (step 209). The original source address may be one of the different source addresses in some scenarios but may not be one of them in other scenarios.

Infrastructure service 101 monitors for one or more replies to the connection requests and identifies the first one to arrive. In addition, infrastructure service 101 identifies the source address to which the reply was sent and uses that address to establish a connection with the origin (step 211). Having established the connection, infrastructure service 101 may proceed to obtain the requested content over the connection (step 213) and deliver the content to the requesting end point, application, service, or the like (step 215).

FIG. 1 illustrates a brief exemplary scenario to further describe the technical effects of connection process 200. In the illustrated scenario, end point 105 sends a content request 111 to infrastructure service 101. The content request 111 is received by server 103 and is parsed to identify the requested content. It is assumed for exemplary purposes that the content is not available in the local cache and server 103 must obtain the content from the origin accordingly.

To do so, server 103 sends a connection request 112 from a first source address (x) to origin server 107. Server 103 also starts a timer, against which the time for a reply to arrive is evaluated. It is further assumed for exemplary purposes that the reply (if any) sent by origin server 107 fails to reach server 103 before the expiration of the timer.

In response to detecting the failure of a reply to arrive within the time limit, server 103 sends multiple connection requests to origin server 107, represented by connection request 113, connection request 114, and connection request 115. Each connection request is sent from a different source address a, b, and c respectively.

Origin server 107 may respond to one or more of the connection requests. When doing so. Origin server 107 sends each reply to the source address in the corresponding request. For example, a reply to connection request 113 would be sent to address a, while a reply to connection request 114 would be sent to address b, and a reply to connection request 115 would be sent to address c.

Server 103 monitors for the replies and identifies the first one to be received. In addition, server 103 identifies the address to which the first reply was sent. It is assumed for exemplary purposes that reply 116, sent to address a, is the first to arrive at server 103. Accordingly, server 103 establishes a connection with origin server 107 and proceeds to exchange one or more messages over the connection using the same address. For example, out-bound messages 117 are sent from address a, while in-bound messages are sent to address a.

Figure 3:
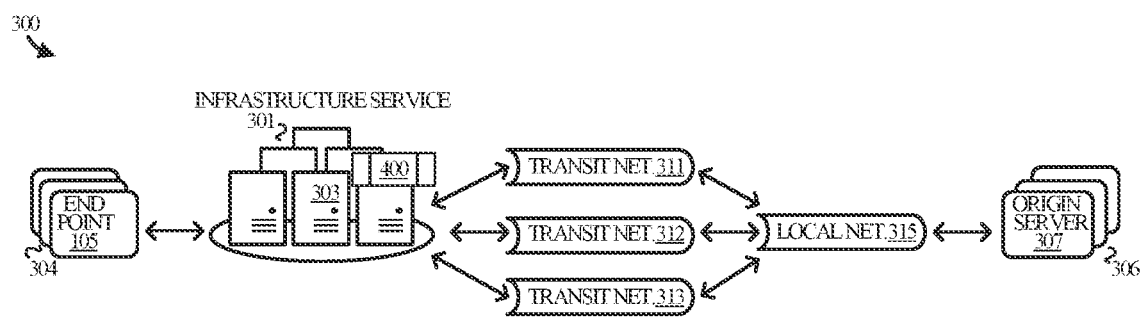
FIG. 3 illustrates an operational environment in an implementation.

FIG. 3 illustrates operational environment 300 in another implementation. Operational environment 300 includes infrastructure service 301, end points 304, origin servers 306, transit networks 311, 312, and 313, and local network 315. End points 304 communicate with infrastructure service 301 over one or more networks to request and obtain content. Infrastructure service 301 may serve the content from a local cache or obtains the data from one or more of origin servers 306, of which origin server 305 is representative.

Infrastructure service 301 is capable of communicating with origin server 306 over transit networks 311, 312, and 312. Each of the transit networks 311, 312, and 313 connect to one or more other networks, of which local network 315 is representative. Local network 315 provides connectivity to origin server 307. It may be appreciated that, while not shown for illustrative purposes, end points 314 may also communicate with infrastructure service over the same or different transit networks via the same or different local network(s).

Infrastructure service 301 is representative of a content delivery network, an edge cloud platform, or the like, and is comprised of various physical and/or virtual computing and communication elements suitable for implementing a variety of associated infrastructure services, of which computing system 601 in FIG. 6 is representative. Infrastructure service 101 may include routers, servers, and other elements that function together to serve content to end points 104. Infrastructure service 101 may obtain the content from origin servers 106 and cache the content on its servers for faster serving to end points. Examples of content that may be served to end points include text, images, video, web pages, objects, applications, or any other type of content.

End points 304 are representative of the various computing devices from which requests for content may originate and to which content may be served, such as consumer devices, enterprise devices, and the like. Examples include, but are not limited to, laptop and desktop computers, tablets, mobile phones, wearable devices, entertainment devices, gaming devices, other server computers, Internet of Things (IoT) devices, or any other type of end point device.

Origin servers 306 are representative of the various physical and/or virtual computing devices capable of storing content and providing the content to infrastructure service 301 to be served to end points. Examples include, but are not limited to, server computers and data storage devices deployed on-premises, in the cloud, or elsewhere, by content providers such as enterprises, organizations, individuals, and the like.

Infrastructure service 301 communicates with origin servers 306 over transport layer connections that are established facilitate the exchange of data. The connections may be established in accordance with a variety of communication protocols such as the transmission control protocol (TCP), the stream control transmission protocol (SCTP), and other connection-oriented protocols. Connectionless protocols such as the user datagram protocol (UDP) may also be employed in some implementations.

In order to establish a connection, infrastructure service 301 sends a connection request to an origin server, e.g. origin server 307. The connection request is sent from a source address allocated to infrastructure service 301 and is routed over any one of transit networks 311, 312, and 313 to local network 315 and onward to origin server 307. The source address in the connection request is one that may be reached by any of the transit networks 311, 312, and 313.

Origin server 107 receives the request and typically sends a reply back to infrastructure service 101 acknowledging the request and potentially including additional information to establish the connection. The reply is sent to the source address of the connection requests and thus may be routed over any one of the transit networks 311, 312, and 313. Which transit network is used is a decision made by local network 315 per its routing configuration.

Unfortunately, the routing decisions made by local network 315 do not always benefit infrastructure service 301. That is, a routing decision made by local network 315 based on cost or bandwidth considerations may be detrimental to the speed with which traffic reaches infrastructure service 301. For example, the interconnect between local network 315 and transit network 311 may be faster than the interconnects between local network 315 and transit networks 312 and 313. Nonetheless, local network 315 may route the reply via one of transit network 312 or 313. The result may not only be a slow reply, but also a connection that is inherently slow since its traffic is likely to flow through a slower interconnect.

Figure 4:
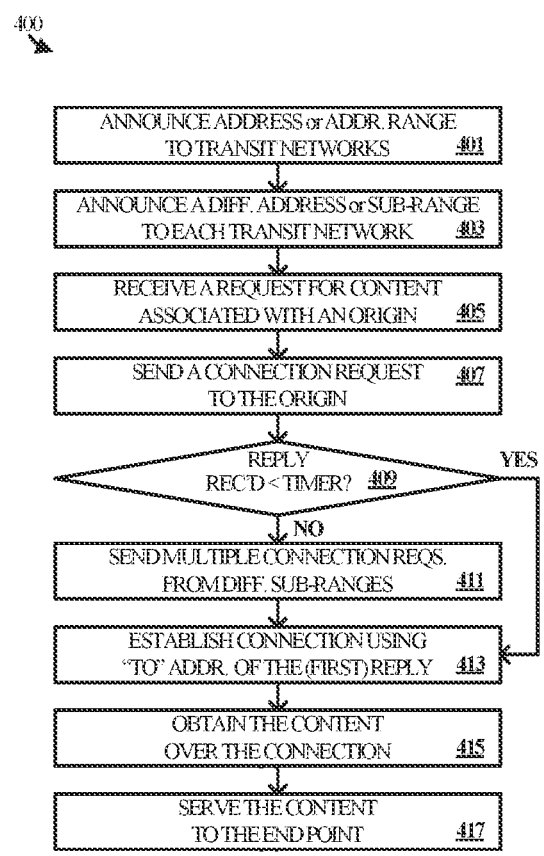
FIG. 4 illustrates a connection process in an implementation.

As such a decision is sub-optimal from the perspective of infrastructure service 301, infrastructure service 301 employs connection process 400 for establishing connections with the origin. Connection process 400 may be implemented in program instructions in the context of any of the software applications, modules, components, or other such programming elements deployed in the various elements of infrastructure service 301, such as routers and servers. The program instructions direct the underlying physical or virtual computing system or systems to operate as follows, referring parenthetically to the steps in FIG. 4 in the context of the operational environment 300 of FIG. 3.

In operation, infrastructure service 301 announces a network address to transit networks 311, 312, and 313 (step 401). The network address is an Internet protocol (IP) addresses that has been allocated to infrastructure service 301. In some scenarios, announcing the network address comprises announcing a specific address allocated to infrastructure service 301. In other cases, announcing the network address comprises announcing a range of addresses that include the address. For example, the range may be announced in accordance with classless inter-domain routing (CIDR) prefix notation, such as /20, /21, or /22 (for IPv4), or /116, 117. Or /118 (for IPv6), although any range is possible, including smaller or larger ranges of addresses.

By announcing the address to the transit networks, infrastructure service 301 is informing the transit networks that the address may be reached at or via the service. The transit networks update their routing tables and also propagate the address to other upstream networks, such as local network 315. This way, local network 315 knows that packets addressed to that address may be sent to their destination via any one of the transit networks.

Next, infrastructure service 301 announces a different address or address range to each of the transit networks 311, 312, and 313 (step 403). That is, infrastructure service 301 announces one address or range to transit network 311, another (different) address or range to transit network 312, and yet another (also different) address or range to transit network 313. The transit networks update their routing tables with the information and propagate the information to upstream networks (e.g. local network 315) so that those networks know where to send packets addressed to any one of the addresses.

In some scenarios, announcing the different addresses comprises announcing specific addresses that are allocated to infrastructure service 301. In other scenarios, announcing the different addresses comprises announcing different ranges of addresses to the transit networks. For instance, a different range of addresses may be announced to each one of the transit network relative to each other of the transit networks. The ranges may be announced in accordance with CIDR prefix notation (for either IPv4 or IPv6). In some cases, the different ranges may be non-overlapping sub-ranges of the range announced in Step 401. For example, the ranges may be announced as /21, /22, or /23 prefixes in IPv4, as /116, /117, or /118 prefixes in IPv6, or as any other prefix more granular than the prefix announced in Step 401.

Having announced the various addresses, ranges of addresses, and/or sub-ranges of addresses to the various transit networks, infrastructure service 301 may receive a request for content in one of its content servers, represented by server 303 (step 405). Assuming that the requested content cannot be served from the local cache, server 303 sends a connection request to the origin associated with the content (step 407). In particular, server 303 sends the connection request to origin server 307 and may do so over any transit network.

The connection request may be sent from the network address that was initially announced individually to all three transit networks or announced within a range sent to all three transit networks. A resulting reply sent by origin server 307 will therefore be sent to the same address and may traverse any of the transit networks. Upon sending the connection request, server 303 starts a timer and monitors for the reply to arrive from origin server 307. If the reply arrives within the time limit (step 409), server 303 proceeds to establish a connection with origin server 307 (step 413), over which the content may be obtained (step 415). If, however, the reply is not received within the time limit (or is not received at all), then server 303 sends multiple connection requests to origin server 307 (step 411), each from a different one of the addresses and/or ranges announced in step 403.

Having sent the connection requests, server 303 monitors for the first reply to arrive in response to the requests and uses the address to which it was sent to establish a connection with origin server 307 (step 413). Server 303 may then obtain content over the connection (step 415) using the same address. This means that out-bound traffic sent by server 303 to origin server 307 is sent from the selected address and in-bound traffic sent by origin server 307 to server 303 is sent to the selected address. Since the selected address was announced to only one of the transit networks, local network 315 necessarily routes the in-bound traffic to the one transit network. This provides the technical advantage of delivering the content to server 303 faster than had a different address been used since the interconnect between local network 315 and the transit network to which the address was announced is presumably faster than the interconnect between the local network 315 and one or more of the other transit networks. This conclusion may be made based on the fact of which address received a reply first. With the content in-hand, server 303 may complete the process by delivering the content to the requesting end point (step 417).

Figure 5A:
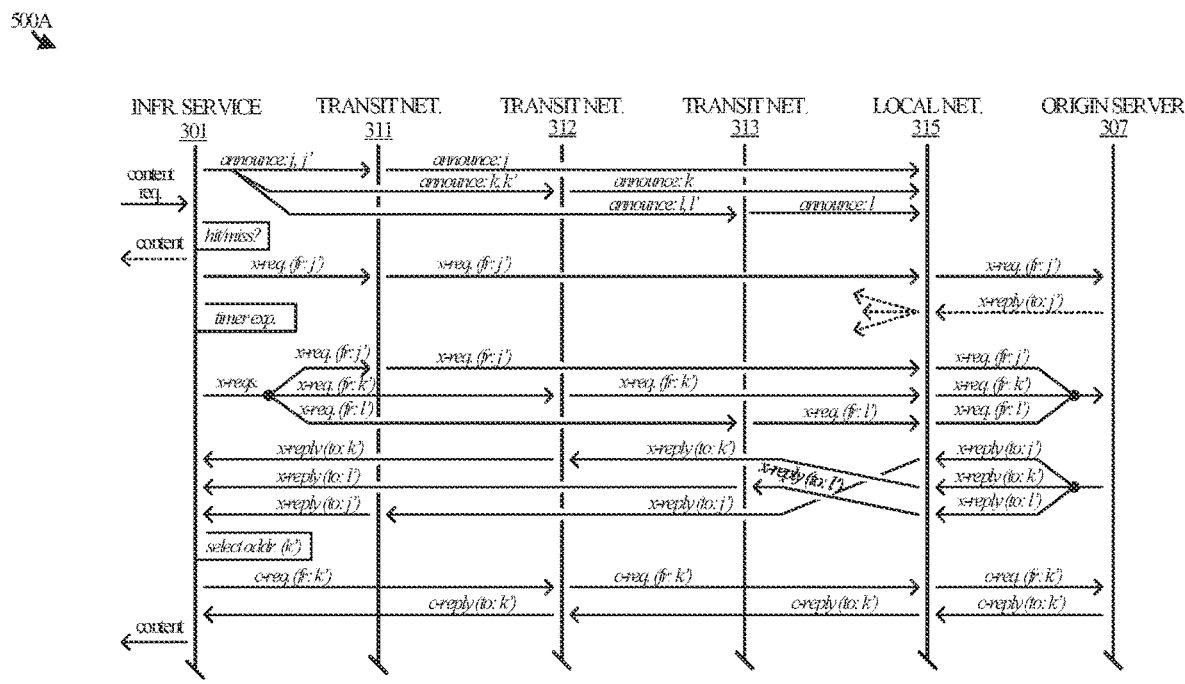
FIG. 5A illustrates an operational sequence in an implementation.

FIG. 5A illustrates an operational sequence 500A to further describe the technical effects of connection process 400. In operational sequence 500A, infrastructure service 301 announces ranges of IP addresses to transit networks 311, 312, and 313. In particular, infrastructure service announces address range j to transit network 311; address range k to transit network 312; and address range l to transit network 313. Each address range j, k, and l may be announced as a different /22 CIDR prefix relative to each other. Each transit network propagates the /22 announcements to local network 315.

As a result, in-bound traffic sent to an address within range j would be routed through transit network 311, while traffic sent to an address within range k would be routed through transit network 312, and traffic sent to an address within range l would be routed through transit network 313.

In addition to the /22 announcements, infrastructure service 301 announces one or more sub-ranges of IP addresses to transit networks 311, 312, and 313. In particular, infrastructure service announces address range j' to transit network 311, which is a sub-range of range j. Address range k', which is a sub-range of range k, is announced to transit network 312, while address range l', which is a sub-range of range l, is announced to transit network 313. Each address range j', k', and l' may be announced as /25 CIDR prefixes that differ relative to each other. However, since local network 315 may not accept announcements smaller than /24 CIDR prefixes, the transit network refrain from propagating the /25 prefixes.

It may be appreciated that, in some implementations, infrastructure service 301 may include multiple Points of Presence (PoPs). In such situations, multiple sub-ranges within each range could be announced to the transit networks, with each of the sub-ranges being associated with a different PoP. For example, sub-ranges j' and j" could be announced to transit network 311, with addresses within j' routing to a first PoP and addresses within j" routing to a second PoP. Sub-ranges k' and k" could also be announced, but to transit network 312, with addresses within k' routing to the first PoP and addresses within k" routing to the second PoP. Lastly, sub-ranges l' and k" could be announced to transit network 313, with addresses within l' routing to the first PoP and addresses within l" routing to the second PoP.

Next, infrastructure service 301 receives a content request from an end point, service, application, or the like, and determines whether the content can be served from its local cache (hit) or must be retrieved from the origin (miss). It is assumed for exemplary purposes that the request is a miss and as such, infrastructure service sends a connection request (x-req) to origin server 307. The connection request is sent from an address within sub-range j', which will cause any reply by origin server 307 to be routed over transit network 311. It may be appreciated that the address within sub-range j' may be the default address used by infrastructure service 301, but any other address could be used instead, including addresses within sub-ranges k' and l'. In addition, the connection request is sent via transit network 311 but could be sent via either of the other transit networks.

Infrastructure service 301 sets a time limit within which to receive a reply from origin server 307. The reply (if any) would be sent to the address within sub-range j'. It is assumed for exemplary purposes that the reply exceeds the time limit, triggering infrastructure service to send multiple connection requests using the different addresses announced to the transit networks. Specifically, a connection request is sent from an address within sub-range j' to origin server 307 via transit network 311, although it could be sent via either of the other transit networks. A connection request is also sent from an address within sub-range k' to origin server 307 via transit network 312, although it could be sent via either of the other transit networks. Lastly, and a connection request is sent from an address within sub-range l' to origin server 307 via transit network 313, although it could be sent via either of the other transit networks. It is assumed for exemplary purposes that all three connection requests are sent at approximately the same time, or within a very narrow time frame from each other, and are received at origin server 307 at approximately the same time, or within a very narrow time frame from each other.

Infrastructure service 301 then monitors for the first reply from origin server 307 to arrive. The connection replies are sent to the addresses from which the connection requests came and are routed over the transit networks to which the addresses were announced. That is, origin server 307 replies to the address in sub-range j' via transit network 311, to the address within sub-range k' via transit network 312, and to the address within sub-range l' via transit network 313. It is assumed for exemplary purposes that the connection reply to the address within sub-range k' arrives first. Infrastructure service 301 therefore utilizes that address to establish a connection with origin server 307. With the connection established, infrastructure service 301 is able to send content requests from the address within sub-range k' to origin server 307 and origin server 307 may reply with the content addressed to the same address. The in-bound content therefore flows via transit network 312, which presumably has the fastest interconnect with local network 315. Out-bound traffic from infrastructure service 301 to origin server 307 may be sent over any of the three transit networks.

Figure 5B:
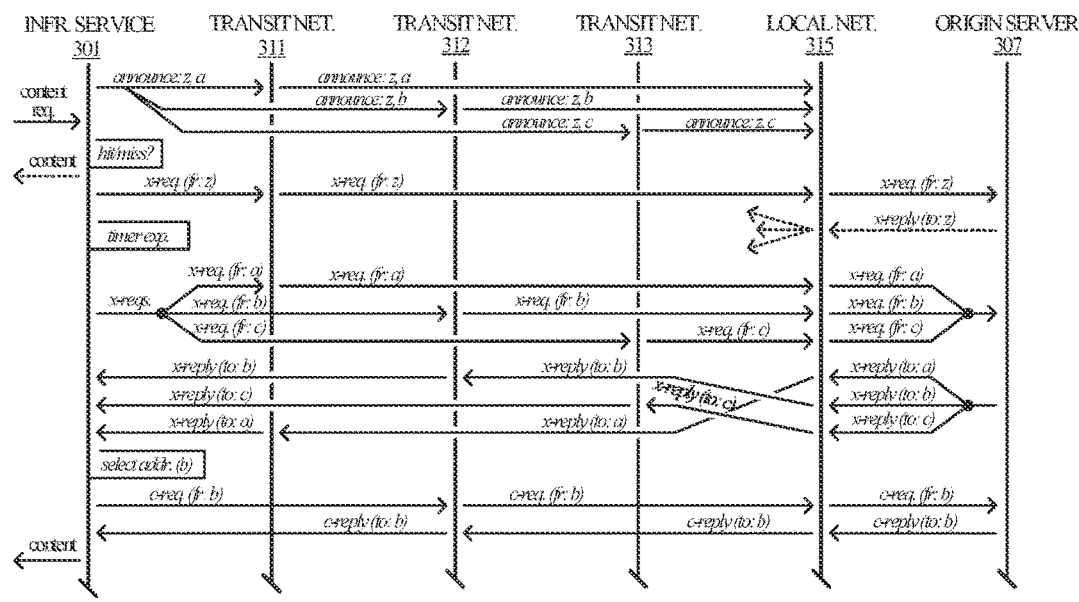
FIG. 5B illustrates an operational sequence in an implementation.

In an alternative, FIG. 5B illustrates an operational sequence 500B to further describe the technical effects of connection process 400. In operational sequence 500B, infrastructure service 301 announces IP addresses (or ranges of addresses) to transit networks 311, 312, and 313, as well as to other networks on the Internet more generally. In particular, infrastructure service announces address z to all three transit networks and other to networks but announces address a to only transit network 311. In addition, infrastructure service announces address b to only transit network 312 and address c to only transit network 313. As a result, in-bound traffic sent to address z from local network 315 may be routed via any of the transit networks, while in-bound traffic sent to address a will only be routed through transit network 311. Similarly, in-bound traffic sent to address a will only be routed through transit network 312 and in-bound traffic sent to address b will only be routed through transit network 313.

Next, infrastructure service 301 receives a content request from an end point, service, application, or the like, and determines whether the content can be served from its local cache (hit) or must be retrieved from the origin (miss). It is assumed for exemplary purposes that the request is a miss and as such, infrastructure service sends a connection request (x-req) to origin server 307. The connection request is sent from address z, which will allow any reply by origin server 307 to be routed over any of the transit networks per the routing decisions made by local network 315. It may be appreciated that address z may be the default address used by infrastructure service 301, but any other address could be used instead, including addresses a, b, and c. In addition, the connection request is sent via transit network 311 but could be sent via either of the other transit networks.

Infrastructure service 301 sets a time limit within which to receive a reply from origin server 307. The reply (if any) would be sent to address z and could be routed over any of the transit networks. It is assumed for exemplary purposes that the reply exceeds the time limit, triggering infrastructure service to send multiple connection requests using the different addresses announced to the transit networks. Specifically, a connection request is sent from address a to origin server 307 via transit network 311, although it could be sent via either of the other transit networks. A connection request is also sent from address b to origin server 307 via transit network 312, although it could be sent via either of the other transit networks. Lastly, and a connection request is sent from address c to origin server 307 via transit network 313, although it could be sent via either of the other transit networks. It is assumed for exemplary purposes that all three connection requests are sent at approximately the same time, or within a very narrow time frame from each other, and are received at origin server 307 at approximately the same time, or within a very narrow time frame from each other.

Infrastructure service 301 then monitors for the first reply from origin server 307 to arrive. The connection replies are sent to the addresses from which the connection requests came and are routed over the transit networks to which the addresses were announced. That is, origin server 307 replies to address a via transit network 311, to address b via transit network 312, and to address c via transit network 313. It is assumed for exemplary purposes that the connection reply to address b arrives first. Infrastructure service 301 therefore utilizes address b to establish a connection with origin server 307. With the connection established, infrastructure service 301 is able to send content requests from address b to origin server 307 and origin server 307 may reply with the content addressed to address b. The in-bound content therefore flows via transit network 312, which presumably has the fastest interconnect with local network 315. Out-bound traffic from infrastructure service 301 to origin server 307 may be sent over any of the three transit networks.

FIG. 6 illustrates computing system 601 that is representative of any system or collection of systems in which the various processes, programs, services, and scenarios disclosed herein may be implemented. Examples of computing system 601 include, but are not limited to, server computers, routers, web servers, cloud computing platforms, and data center equipment, as well as any other type of physical or virtual server machine, physical or virtual router, container, and any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609 (optional). Processing system 602 is operatively coupled with storage system 603, communication interface system 607, and user interface system 609.

Processing system 602 loads and executes software 605 from storage system 603. Software 605 includes and implements connection process 606, which is representative of the connection processes discussed with respect to the preceding Figures. When executed by processing system 602, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Processing system 602 may be implemented within a single processing device but may also be distributed across multiple processing devices or sub-systems that cooperate in executing program instructions. Examples of processing system 602 include general purpose central processing units, graphical processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device but may also be implemented across multiple storage devices or sub-systems co-located or distributed relative to each other. Storage system 603 may comprise additional elements, such as a controller, capable of communicating with processing system 602 or possibly other systems.

Software 605 (including connection process 606) may be implemented in program instructions and among other functions may, when executed by processing system 602, direct processing system 602 to operate as described with respect to the various operational scenarios, sequences, and processes illustrated herein. For example, software 605 may include program instructions for implementing a connection process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtualization software, or other application software. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to establish connections and handle content as described herein. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating an infrastructure service comprising:
    receiving a request from an end point for content associated with an origin;
    sending a connection request to the origin from an initial network address;
    in response to a trigger, sending alternate connection requests to the origin from different network addresses;
    receiving one or more replies to the alternate connection requests;
    identifying which reply of the one or more replies was received first and a network address to which the reply was sent;
    establishing a connection with the origin using the network address; and
    obtaining the content from the origin over the connection.

2. The method of claim 1 further comprising:
    announcing, to transit networks that carry traffic between the infrastructure service and the origin, a range of network addresses for reaching the infrastructure service; and
    announcing, to the transit networks, sub-ranges of the range of network addresses;
    wherein a different one of the sub-ranges is announced to each one of the transit networks;
    wherein the initial network address falls within the range of network addresses; and
    wherein at least two of the different network addresses fall within at least two of the sub-ranges of the range of network addresses.

3. The method of claim 2 wherein:
    announcing the range of network addresses to the transit networks comprises announcing an address prefix; and
    announcing the sub-ranges to the transit networks comprises announcing address prefixes more granular than the address prefix.

4. The method of claim 3 wherein the address prefix comprises a classless inter-domain routing (CIDR) prefix and wherein the more granular address prefixes comprise CIDR prefixes that are longer than the CIDR prefix and that fall within the CIDR prefix.

5. The method of claim 4 wherein:
    the transit networks announce the range of network addresses to other networks; and
    the transit networks do not announce the sub-ranges to the other networks.

6. The method of claim 1 comprising monitoring for the origin to respond to the connection request within a time limit and providing the trigger upon the origin failing to respond to the connection request within the time limit.

7. The method of claim 1 wherein each of the one or more replies to the connection requests is received at a different one of the addresses.

8. A computing apparatus comprising:
one or more computer readable storage media;
a processing system operatively coupled with the one or more computer readable storage media; and
program instructions stored on the one or more computer readable storage media for operating an infrastructure service that, when executed by the processing system, direct the computing apparatus to at least:
receive a request from an end point for content associated with an origin;
send a connection request to the origin from an initial network address;
in response to a trigger, send alternate connection requests to the origin from different network addresses;
receive one or more replies to the alternate connection requests;
identify which reply of the one or more replies was received first and a network address to which the reply was sent; and
establish a connection with the origin using the network address.

9. The computing apparatus of claim 8 wherein:
the initial network address falls within a range of network addresses announced by the infrastructure service to transit networks that carry traffic between the infrastructure service and the origin; and
at least two of the different network addresses fall within at least two of the sub-ranges of the range of network addresses.

10. The computing apparatus of claim 9 wherein:
the range of network addresses announced to the transit networks comprises an address prefix; and
the sub-ranges announced to the transit networks comprise address prefixes more granular than the address prefix.

11. The computing apparatus of claim 10 wherein the address prefix comprises a classless inter-domain routing (CIDR) prefix and wherein the address prefixes comprise CIDR prefixes that are longer than the CIDR prefix and that fall within the CIDR prefix.

12. The computing apparatus of claim 11 wherein:
the transit networks announce the range of network addresses to other networks; and
the transit networks do not announce the sub-ranges to the other networks.

13. The computing apparatus of claim 8 wherein the program instructions direct the computing system to monitor for the origin to respond to the connection request within a time limit and provide the trigger upon the origin failing to respond to the connection request within the time limit.

14. The computing apparatus of claim 8 wherein the program instructions further direct the computing system to obtain the content from the origin over the connection and send the content to the end point.

15. A method of operating an infrastructure service comprising:
receiving a request from an end point for content associated with an origin;
sending a connection request to the origin from an initial network address included within a range of network addresses announced to transit networks that carry traffic between the infrastructure service and the origin;
in response to a trigger, sending additional connection requests to the origin from different network addresses included within sub-ranges, of the range of network addresses, announced to the transit networks;
receiving one or more replies to the connection requests;
identifying which reply of the one or more replies was received first and a network address to which the reply was sent;
establishing a connection with the origin using the network address; and
obtaining the content from the origin over the connection.

16. The method of claim 15 wherein a different one of the sub-ranges is announced to each one of the transit networks and wherein at least two of the different network addresses fall within at least two of the sub-ranges of the range of network addresses.

17. The method of claim 16 wherein the range of network addresses comprises an address prefix and wherein the sub-ranges comprise address prefixes more granular than the address prefix.

18. The method of claim 17 wherein the address prefix comprises a classless inter-domain routing (CIDR) prefix and wherein the address prefixes comprise CIDR prefixes that are longer than the CIDR prefix and that fall within the CIDR prefix.

19. The method of claim 15, comprising monitoring for the origin to respond to the connection request within a time limit and providing the trigger upon the origin failing to respond to the connection request within the time limit.

20. The method of claim 15 wherein the connection comprises a transmission control protocol (TCP) connection.

* * * * *